(12) United States Patent
Horiguchi et al.

(10) Patent No.: US 10,444,731 B2
(45) Date of Patent: Oct. 15, 2019

(54) CONTROLLER AND MACHINE LEARNING DEVICE

(71) Applicant: FANUC Corporation, Yamanashi (JP)

(72) Inventors: Kouichirou Horiguchi, Yamanashi (JP); Keisuke Tsujikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/964,469

(22) Filed: Apr. 27, 2018

(65) Prior Publication Data

US 2018/0314233 A1 Nov. 1, 2018

(30) Foreign Application Priority Data

Apr. 28, 2017 (JP) .............................. 2017-090121

(51) Int. Cl.
*G06F 19/00* (2018.01)
*G05B 19/408* (2006.01)
(Continued)

(52) U.S. Cl.
CPC ....... *G05B 19/4083* (2013.01); *G05B 13/027* (2013.01); *G05B 19/4141* (2013.01);
(Continued)

(58) Field of Classification Search
CPC ............ G05B 19/4083; G05B 19/4141; G05B 19/4183; G05B 13/027; G05B 2219/33342; G05B 2219/50218
See application file for complete search history.

(56) References Cited

U.S. PATENT DOCUMENTS 4,093,904 A * 6/1978 Burig ................... G05B 19/353
318/616
7,456,599 B2 * 11/2008 Piefer ................... B41F 13/004
318/41
(Continued)

FOREIGN PATENT DOCUMENTS

JP   H5-181533 A   7/1993
JP   H8-147017 A   6/1996
(Continued)

OTHER PUBLICATIONS

Office Action in JP Application No. 2017-090121, dated Aug. 21, 2018, 7pp.

*Primary Examiner* — Michael D Masinick
(74) *Attorney, Agent, or Firm* — Hauptman Ham, LLP

(57) ABSTRACT

A controller that can perform high-precision synchronous control even when the speed of a master axis changes and a machine learning device are provided. The controller includes the machine learning device that learns the future predicted position of the master axis with respect to the operation state of the master axis, and the machine learning device includes a state observing section that observes, as a state variable indicating the current state of an environment, master axis predicted position data indicating the future predicted position of the master axis and master axis operation state data indicating the operation state of the master axis, a judgment data acquiring section that acquires judgment data indicating the properness judgment result of a synchronization error of a slave axis, and a learning section that learns the future predicted position of the master axis by correlating the future predicted position of the master axis with the master axis operation state data by using the state variable and the judgment data.

9 Claims, 10 Drawing Sheets

(51) Int. Cl.
*G05B 13/02* (2006.01)
*G05B 19/418* (2006.01)
*G05B 19/414* (2006.01)

(52) U.S. Cl.
CPC .............. *G05B 19/4183* (2013.01); *G05B 2219/33342* (2013.01); *G05B 2219/50218* (2013.01)

(56) References Cited

U.S. PATENT DOCUMENTS

| | | | |
|---|---|---|---|
| 2006/0267529 A1* | 11/2006 | Piefer | B41F 13/004 318/432 |
| 2007/0205738 A1 | 9/2007 | Iwashita et al. | |
| 2013/0134919 A1* | 5/2013 | Takayama | G05B 19/416 318/625 |
| 2015/0253780 A1* | 9/2015 | Saitou | G05D 3/121 700/213 |
| 2015/0362895 A1* | 12/2015 | Horiguchi | G05B 19/19 318/561 |
| 2016/0231733 A1* | 8/2016 | Nagatani | G05B 19/0426 |
| 2017/0028558 A1* | 2/2017 | Nishi | B25J 9/1666 |
| 2018/0076955 A1* | 3/2018 | Shields | H04W 4/70 |
| 2018/0314233 A1* | 11/2018 | Horiguchi | G05B 19/4083 |

FOREIGN PATENT DOCUMENTS

| | | |
|---|---|---|
| JP | 2007-206857 A | 8/2007 |
| JP | 2009-169468 A | 7/2009 |
| JP | 2011-212788 A | 10/2011 |
| JP | 2016-4435 A | 1/2016 |

* cited by examiner

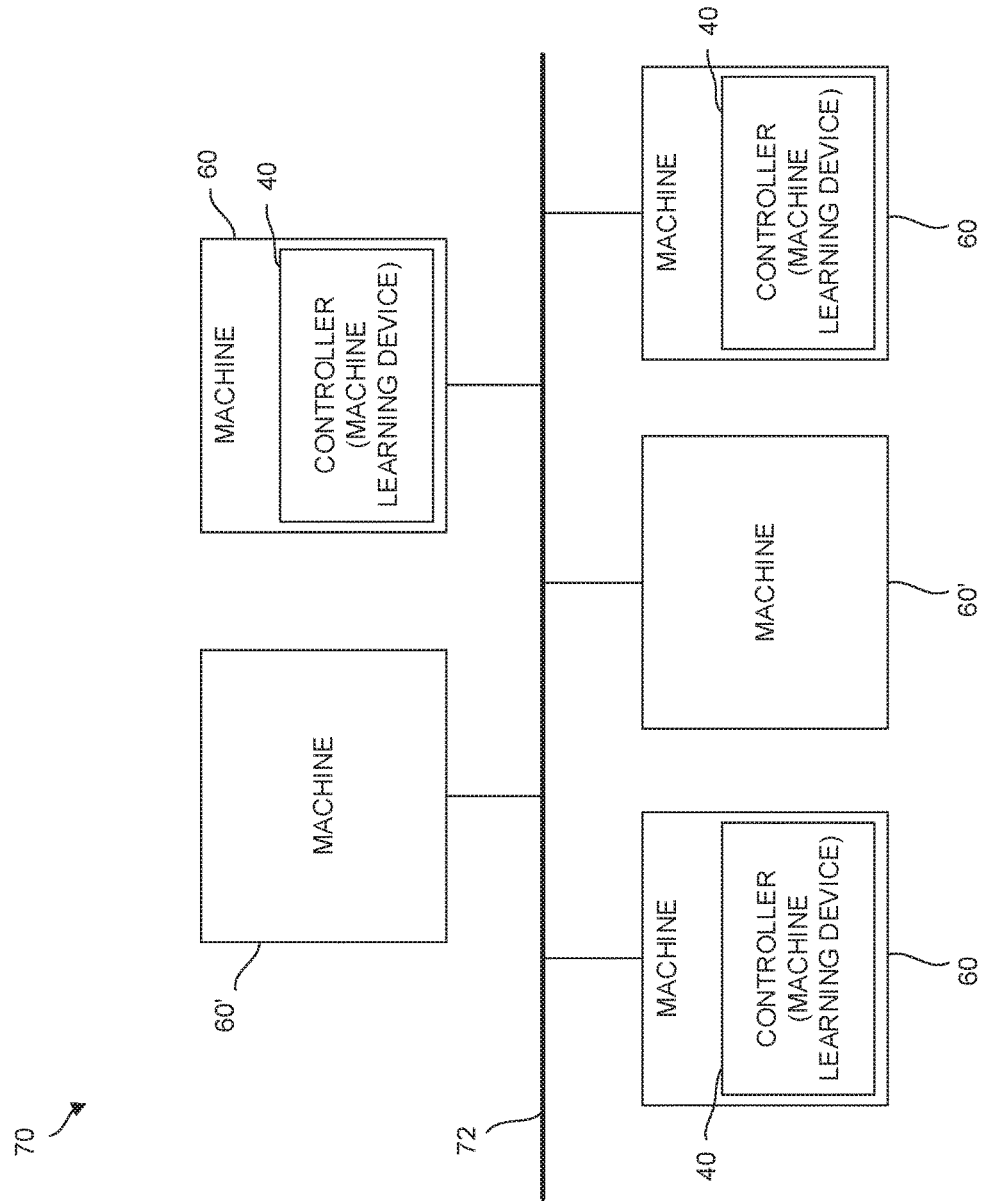

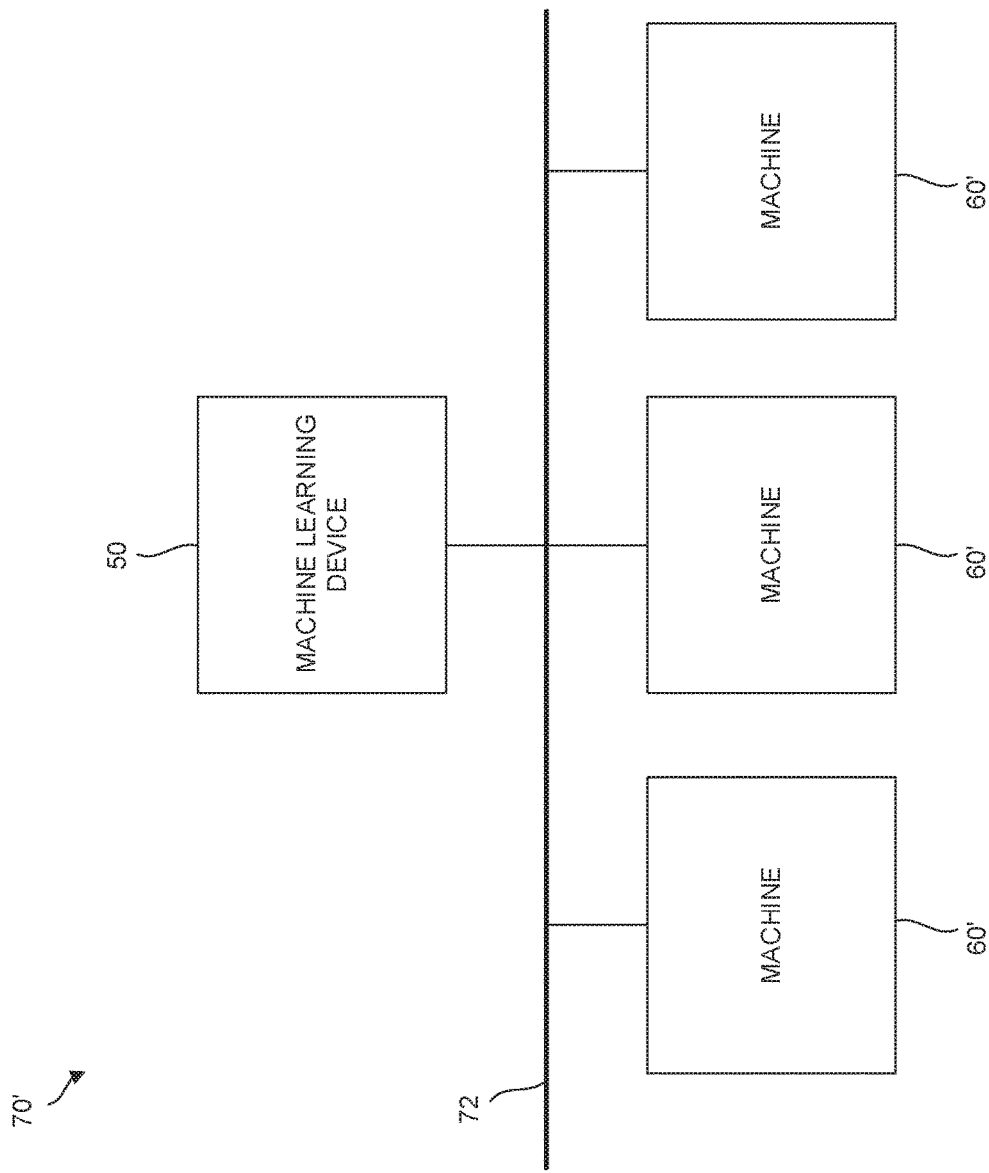

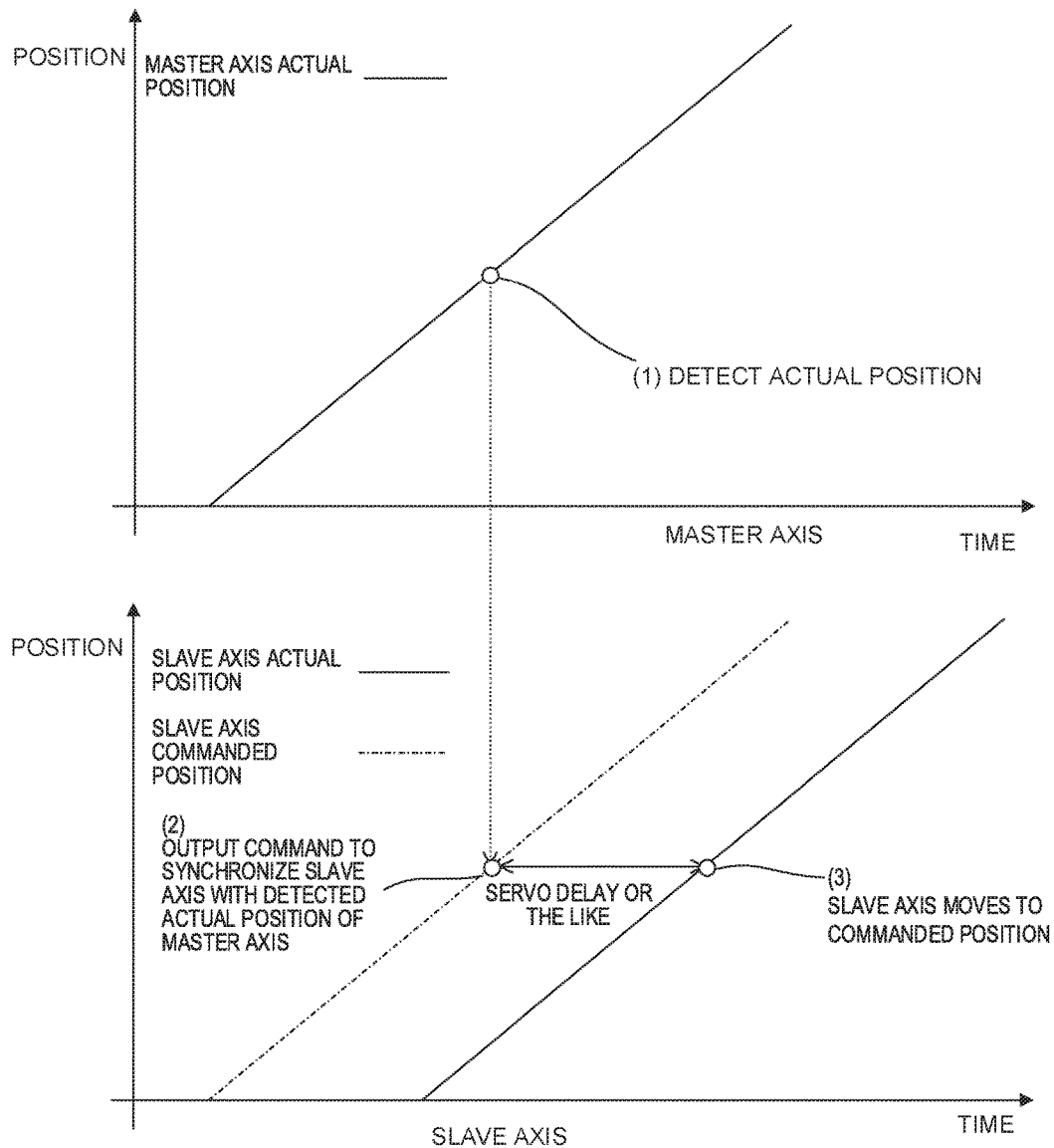

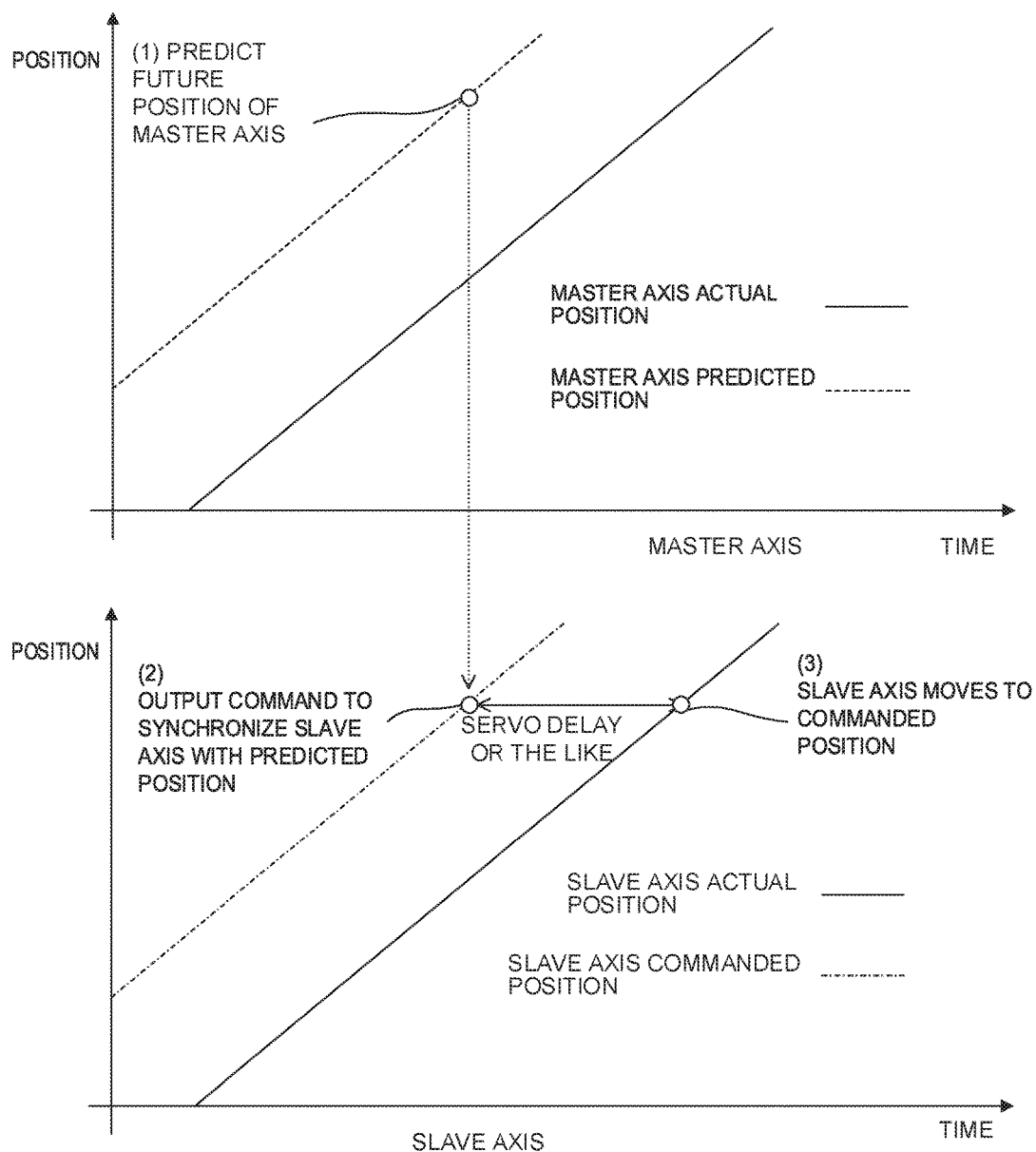

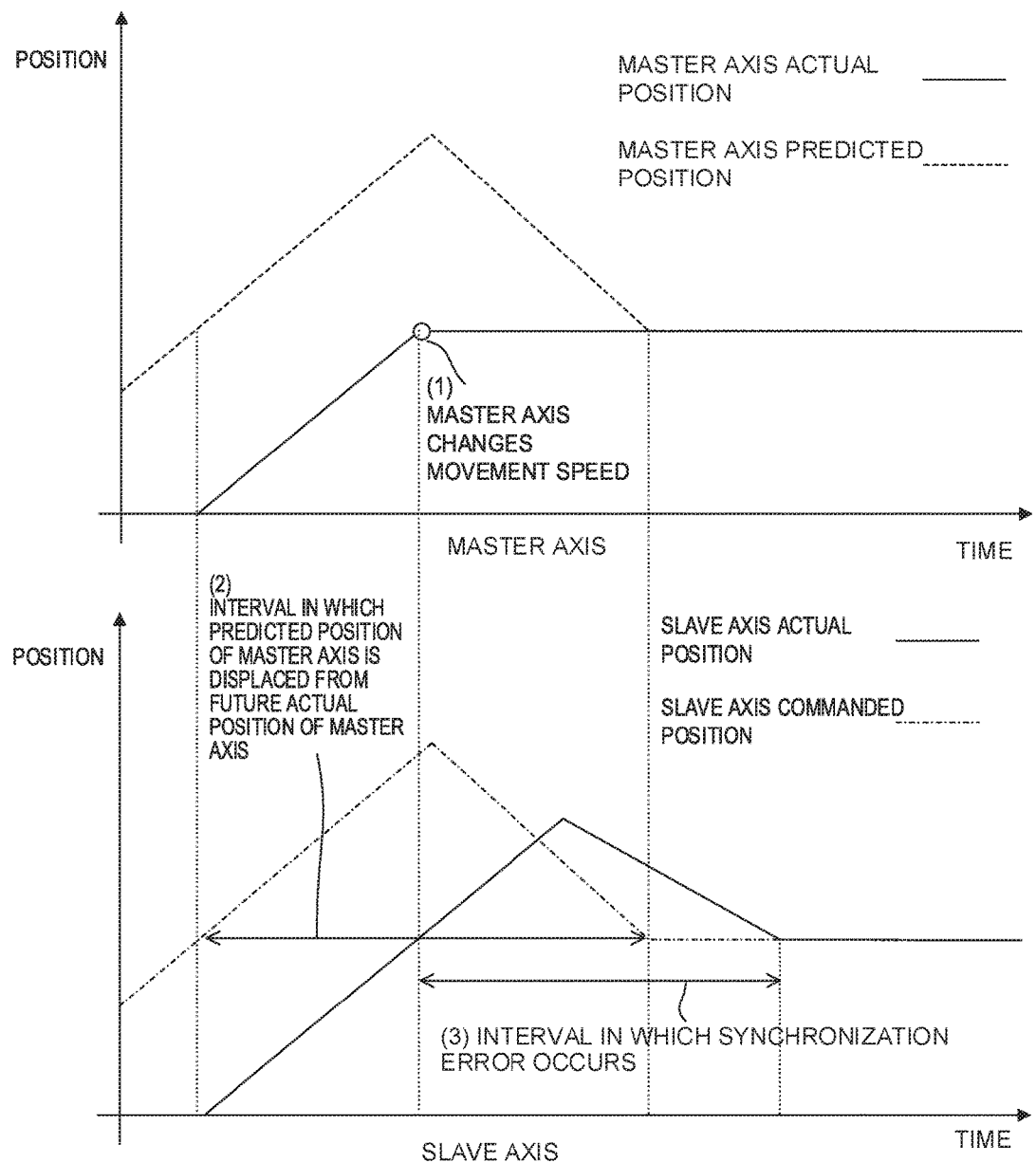

CONTROLLER AND MACHINE LEARNING DEVICE

RELATED APPLICATIONS

The present application claims priority to Japanese Application Number 2017-090121, filed on Apr. 28, 2017, the disclosure of which is hereby incorporated by reference herein in its entirety.

BACKGROUND OF THE INVENTION

1. Field of the Invention

The present invention relates to controllers and machine learning devices and, in particular, relates to a controller that performs high-precision synchronous control on an external axis and to a machine learning device.

2. Description of the Related Art

In the past, synchronous control by which the real position (actual position) of a master axis is obtained by detecting the position of the master axis by a sensor or the like and a synchronization command is issued to a slave axis so that the slave axis is synchronized with the actual position has been performed (for example, Japanese Patent Application Laid-Open No. 2016-004435).

FIG. 8 is a diagram illustrating the relationship between the commanded position and the actual position of the slave axis with respect to the actual position of the master axis. As illustrated in FIG. 8, in synchronous control, when (1) the actual position of the master axis is detected by a sensor or the like and (2) a command is issued to the slave axis so that the slave axis is synchronized with the detected actual position, since (3) the actual position of the slave axis reaches a commanded position after a lapse of a delay time caused by servo delay or the like, a synchronization error by the delay time occurs between the actual position of the master axis and the actual position of the slave axis.

To eliminate such a synchronization error, when synchronous control is performed, as illustrated in FIG. 9, (1) the future position of the master axis with consideration given to a delay time caused by servo delay or the like of the slave axis is predicted and (2) a command to synchronize the slave axis with the predicted position of the master axis is issued to the slave axis. When the future position of the master axis is predicted, the future position of the master axis is obtained by using, for example, the average value of the past movement speed of the master axis on the assumption that the master axis moves at a constant speed only for a predicted time (the predicted position=(the master axis average speed× the predicted time)+the current position of the master axis).

However, if there are speed fluctuations, such as acceleration, deceleration, and halt, in the movement speed of the master axis, the prediction about the future position of the master axis in synchronous control does not come true. In such a case, a difference between the synchronous position of the slave axis based on the predicted position of the master axis and the correct synchronous position of the slave axis based on the actual position of the master axis becomes large, and a synchronization error occurs. For instance, as illustrated in FIG. 10, (1) if the master axis changes the movement speed, (2) the prediction about the future position of the master axis is displaced from the future actual position of the master axis and (3) a synchronization error occurs until the position of the slave axis is corrected to the correct synchronous position of the slave axis based on the actual position of the master axis.

To address such a problem, in Japanese Patent Application Laid-Open No. 2016-004435, an increase in the number of synchronization errors, which is observed when the speed of the master axis changes, is curbed by switching the gain of position control during synchronous control, but the occurrence itself of a synchronization error cannot be curbed.

SUMMARY OF THE INVENTION

An object of the present invention is accordingly to provide a controller that can perform high-precision synchronous control even when the speed of a master axis changes and to provide a machine learning device.

In a controller of the present invention, machine learning of a correspondence relationship of the future position of the master axis after a lapse of a predetermined time with the actual position of a master axis in a predetermined past period is performed. The controller of the present invention implements high-precision synchronous control by predicting the future position of the master axis after a lapse of a predetermined time by using the actual position of the master axis in a predetermined past period based on the result of machine learning and synchronizing the slave axis with the predicted future position of the master axis.

An aspect of the present invention is a controller that performs synchronous control of a slave axis so that the slave axis is synchronized with the position of a master axis, and the controller includes a machine learning device that learns the future predicted position of the master axis with respect to the operation state of the master axis. The machine learning device includes: a state observing section that observes, as a state variable indicating the current state of an environment, master axis predicted position data indicating the future predicted position of the master axis and master axis operation state data indicating the operation state of the master axis; a judgment data acquiring section that acquires judgment data indicating the properness judgment result of a synchronization error of the slave axis; and a learning section that learns the future predicted position of the master axis by correlating the future predicted position of the master axis with the master axis operation state data by using the state variable and the judgment data.

Another aspect of the present invention is a machine learning device that learns the future predicted position of a master axis with respect to the operation state of the master axis in synchronous control of a machine, the synchronous control by which a slave axis is synchronized with the position of the master axis. The machine learning device includes: a state observing section that observes, as a state variable indicating the current state of an environment, master axis predicted position data indicating the future predicted position of the master axis and master axis operation state data indicating the operation state of the master axis; a judgment data acquiring section that acquires judgment data indicating the properness judgment result of a synchronization error of the slave axis; and a learning section that learns the future predicted position of the master axis by correlating the future predicted position of the master axis with the master axis operation state data by using the state variable and the judgment data.

According to the present invention, it is possible to provide a controller that can perform high-precision synchronous control even when the speed of a master axis changes and to provide a machine learning device.

BRIEF DESCRIPTION OF THE DRAWINGS

These and other objects and features of the present invention will become apparent from the following description of exemplary embodiments with reference to the accompanying drawings in which:

FIG. 6 is a schematic functional block diagram depicting a mode of a component mounting system;

FIG. 7 is a schematic functional block diagram depicting another mode of the component mounting system;

FIG. 8 is a diagram explaining synchronous control of a slave axis with respect to a master axis, which is performed in a prior art technique;

FIG. 9 is a diagram explaining the synchronous control of the slave axis with respect to the master axis, which is performed in the prior art technique; and FIG. 10 is a diagram explaining a problem of the synchronous control of the slave axis with respect to the master axis, which is performed in the prior art technique.

DETAILED DESCRIPTION OF THE PREFERRED EMBODIMENTS

Hereinafter, embodiments of the present invention will be described along with the drawings.

Figure 1:
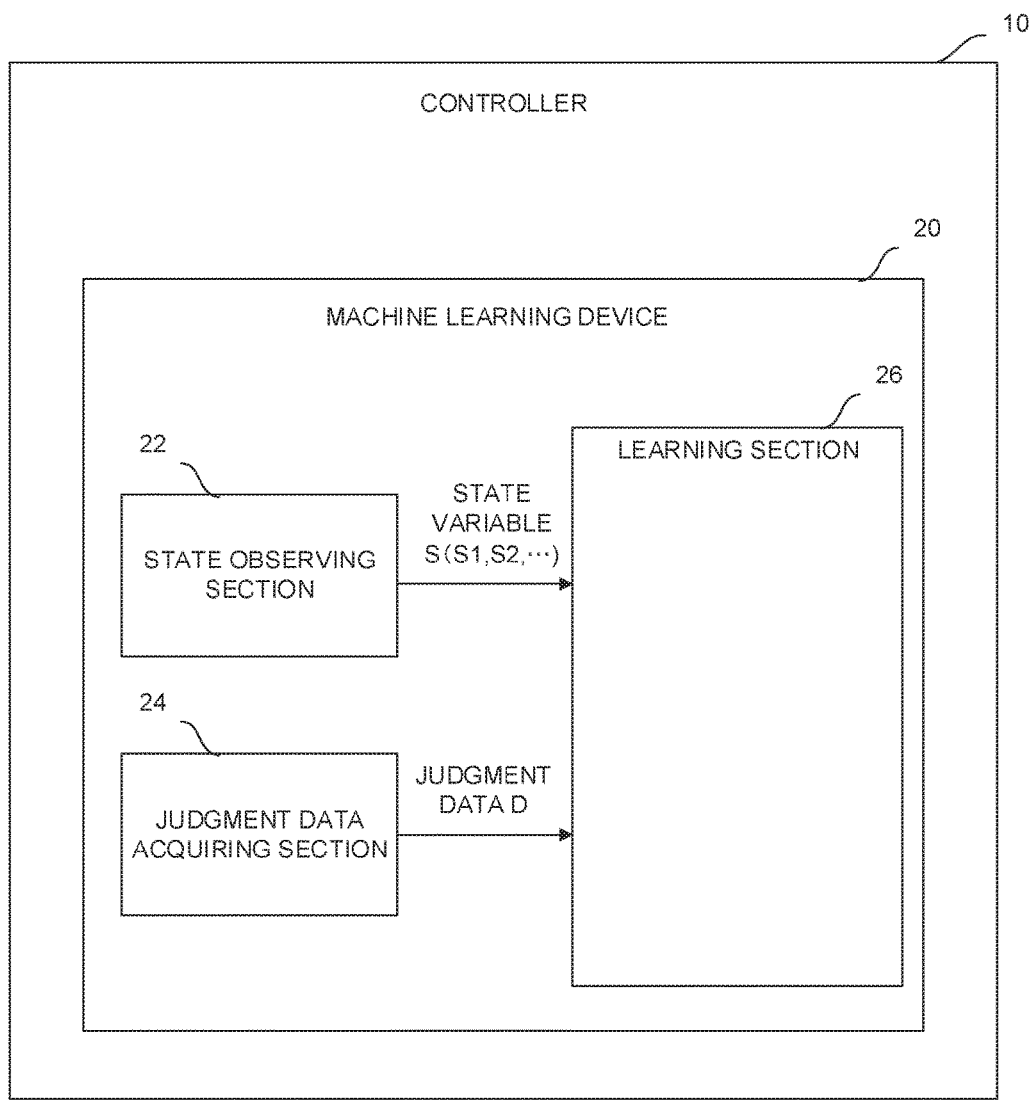
FIG. 1 is a schematic functional block diagram of a controller according to a first embodiment.

FIG. 1 is a schematic functional block diagram of a controller 10 according to a first embodiment. The controller 10 can be implemented as a controller that performs synchronous control by which, for example, a slave axis is controlled so as to be synchronized with the position of a master axis. The controller 10 is provided with a machine learning device 20 including software (such as a learning algorithm) and hardware (such as a CPU of a computer) for learning for itself the future position of the master axis with respect to the past operation state of the master axis by so-called machine learning. What is learned by the machine learning device 20 of the controller 10 corresponds to a model structure indicating a correlation between the past operation state of the master axis and the future position of the master axis in that state.

As depicted in FIG. 1 as a functional block, the machine learning device 20 of the controller 10 includes a state observing section 22 that observes, as a state variable S indicating the current state of an environment, master axis predicted position data S1 indicating the future position of the master axis predicted with respect to the past operation state of the master axis and master axis operation state data S2 indicating the past operation state of the master axis, a judgment data acquiring section 24 that acquires judgment data D indicating the properness judgment result of a synchronization error of the position of the slave axis subjected to the synchronous control based on the predicted future position of the master axis, and a learning section 26 that performs learning by correlating the master axis operation state data S2 with the master axis predicted position data S1 by using the state variable S and the judgment data D.

The state observing section 22 can be configured as a function of a CPU of a computer, for example. Alternatively the state observing section 22 can be configured as, for instance, software for making the CPU of the computer function. Of the state variable S which is observed by the state observing section 22, the master axis predicted position data S1 is the predicted future position of the master axis after a lapse of a predetermined delay time $T_2$, such as servo delay of the slave axis, from a point in time at which the controller 10 issues a slave axis position command. In an early stage of learning, for example, the master axis predicted position data S1 can be calculated with consideration given to servo delay or the like based on a teach position of the slave axis, which is provided to the controller 10 by a skilled operator with respect to the position of the master axis, or the predicted position of the master axis which was predicted by a prior art technique can be used as the master axis predicted position data S1. Moreover, in a stage in which learning has advanced to some extent, as the master axis predicted position data S1, the predicted position of the master axis which was predicted by the machine learning device 20 in the previous processing cycle based on the learning result of the learning section 26 can be used; in such a case, the machine learning device 20 may temporarily store the predicted position of the master axis in internal memory (not depicted in the drawing) in each processing cycle and the state observing section 22 may acquire, from the internal memory, the predicted position of the master axis which was predicted by the machine learning device 20 in the previous processing cycle.

Moreover, of the state variable S, as the master axis operation state data S2, for example, the value of the actual position of the master axis which was measured by a first measuring device (not depicted in the drawing) attached to a machine with the master axis or a series of the past positions of the master axis, which was generated by using the actual position or the like of the master axis acquired from a controller that controls the master axis, can be used. As the master axis operation state data S2, for example, a set of the actual positions of the master axis for each fixed time t in a period back in time by a previously set predetermined time $T_1$ from the current time can be used. It is desirable that the predetermined time $T_1$ is longer than at least a period in which a constant speed motion continues in an operation of the master axis. The master axis operation state data S2 is not limited to the position of the master axis, and any one piece or a plurality of pieces of data such as the speed, acceleration, torque, current, and motor temperature of the master axis and a command (a position command, a speed command, and a torque command) to the master axis can also be used as the master axis operation state data S2.

The first measuring device is a measuring device that is used to measure the actual position of the master axis. The first measuring device measures, for example, a distance from a predetermined reference position of the machine with the master axis, and the actual position of the master axis is calculated based on the distance from the predetermined reference position measured by the first measuring device. This calculation can also be performed by for example, the controller 10 or the state observing section 22 itself. As the first measuring device, a rotary encoder, a linear encoder, an optical imaging device, an infrared laser, an ultrasonic meter, or the like can be adopted.

The judgment data acquiring section 24 can be configured as a function of the CPU of the computer, for example.

Alternatively, the judgment data acquiring section 24 can be configured as, for instance, software for making the CPU of the computer function. The judgment data D which is acquired by the judgment data acquiring section 24 can be acquired by obtaining, at a point in time at which the slave axis has moved to a commanded position by the synchronous control after a lapse of a time such as servo delay after the synchronous control of the slave axis was actually performed, the correct synchronous position of the slave axis based on the actual position of the master axis acquired from, for example, the first measuring device or the controller that controls the master axis and calculating a difference (a so-called synchronization error) between the commanded position by the synchronous control and the correct synchronous position. The judgment data D is an indicator indicating the result obtained when the synchronous control is performed by using the state variable S and indirectly indicates the state of the synchronous control.

As described above, while the machine learning device 20 of the controller 10 advances learning, acquisition of the master axis operation state data S2, execution of the synchronous control of the slave axis, and acquisition of a synchronization error as the judgment data D are performed in the environment.

The learning section 26 can be configured as a function of the CPU of the computer, for example. Alternatively the learning section 26 can be configured as, for instance, software for making the CPU of the computer function. The learning section 26 learns the future position of the master axis with respect to the past operation state of the master axis in accordance with an arbitrary learning algorithm which is generically called machine learning. The learning section 26 can repeatedly perform learning based on a data set including the above-described state variable S and judgment data D for execution of a plurality of cycles of the synchronous control of the slave axis with respect to the position of the master axis. While a learning cycle for the synchronous control of the slave axis with respect to the position of the master axis is repeatedly performed, the master axis predicted position data S1 of the state variable S is the predicted position of the master axis obtained by the previous learning cycle and the judgment data D is the properness judgment result of a synchronization error in the synchronous control of the slave axis based on the predicted position of the master axis thus determined.

By repeating such a learning cycle, the learning section 26 can automatically identify features that imply a correlation between the past operation state of the master axis (the master axis operation state data S2) and the future predicted position of the master axis. At the start of the learning algorithm, a correlation between the master axis operation state data S2 and the future predicted position of the master axis is substantially unknown; however, the learning section 26 gradually identifies features with the progress of learning and interprets a correlation. When a correlation between the master axis operation state data S2 and the future predicted position of the master axis is interpreted to a level which is reliable to some extent, the learning result which is repeatedly output from the learning section 26 can be used for making a selection of an action (that is, making a decision) as to, based on what sort of future predicted position of the master axis, the synchronous control of the slave axis has to be performed with respect to the current state (that is, the operation state of the master axis). That is, the learning section 26 can make a correlation between the operation state of the master axis and the future predicted position of the master axis with respect to that state gradually closer to an optimum solution with the progress of the learning algorithm. Then, as learning by the learning section 26 about a correlation between the operation state of the master axis and the future predicted position of the master axis with respect to that state is optimized, more appropriate synchronous control of the slave axis can be performed with respect to the operation state of the master axis.

As described above, in the machine learning device 20 of the controller 10, the learning section 26 learns the future position of the master axis with respect to the past operation state of the master axis in accordance with the machine learning algorithm by using the state variable S observed by the state observing section 22 and the judgment data D acquired by the judgment data acquiring section 24. The state variable S is configured with data that is not easily affected by a disturbance, such as the master axis predicted position data S1 and the master axis operation state data S2, and the judgment data D is uniquely determined by obtaining a synchronization error of the slave axis when the synchronous control is performed based on the future predicted position of the master axis. The master axis operation state data S2 depends on, for instance, the capacity of the first measuring device or the accuracy of the value which is acquired from the controller of the master axis, which itself probably makes it possible to observe high-precision master axis operation state data S2. Moreover, also for the judgment data D, it is expected that high-precision judgment data D can be acquired depending on the capacity of the first measuring device or the accuracy of the value which is acquired from the controller of the master axis. Thus, with the machine learning device 20 of the controller 10, by using the learning result of the learning section 26, it is possible to obtain the future predicted position of the master axis in accordance with the operation state of the master axis automatically and accurately without the help of calculation or estimate.

If the future predicted position of the master axis in accordance with the operation state of the master axis can be automatically obtained without the help of calculation or estimate, by only grasping the operation state of the master axis (the master axis operation state data S2) before the start of the synchronous control of the slave axis, it is possible to determine the future predicted position of the master axis quickly.

According to the above-described embodiment, when, in particular, the master axis is performing a cycle operation with a predetermined period, by repeating learning, it is possible to predict the future predicted position of the master axis with respect to the operation state thereof with a high degree of precision.

Moreover, even when there is a change in speed fluctuations of the master axis as a result of a gear of a speed reducer being worn or degraded, for example, in the master axis or the operation of the master axis being affected by, for example, a temperature change or vibrations, since it is possible to perform the learning of the future predicted position of the master axis in accordance with the change in speed fluctuations of the master axis, it can be expected that the future position of the master axis which follows the change in speed fluctuations of the master axis is predicted based on the learning result.

As a modified example of the machine learning device 20 of the controller 10, the state observing section 22 can further observe, as the state variable S, slave axis operation state data S3 including, for example, the actual position of the slave axis. As the slave axis operation state data S3, for example, a set of the actual positions of the slave axis for each fixed time t in a period back in time by a previously set predetermined time $T_3$ from the current time can be used. The state observing section 22 can acquire the slave axis operation state data S3 from a servo control section or the like of the slave axis which is controlled by the controller 10, for example. In such a case, the learning section 26 can learn the future predicted position of the master axis by correlating the future predicted position of the master axis with both the master axis operation state data S2 and the slave axis operation state data S3. The slave axis operation state data S3 is not limited to the position of the slave axis, and any one piece or a plurality of pieces of data such as the speed, acceleration and deceleration, torque, current, and motor speed of the slave axis and data on a synchronization relationship between the master axis and the slave axis can also be used as the slave axis operation state data S3.

According to the above-described modified example, since the machine learning device 20 can learn the future predicted position of the master axis by correlating the future predicted position of the master axis with the operation state of the slave axis in addition to the operation state of the master axis, even when the operation state of the slave axis changes as a result of a disturbance or the like in the slave axis when there is no change in the operation state of the master axis, the machine learning device 20 can learn the optimum future predicted position of the master axis for synchronization of the slave axis in that state.

As another modified example of the machine learning device 20 of the controller 10, by using the state variable S and the judgment data D obtained for each of a plurality of machines having the same configuration, the learning section 26 can learn the future predicted positions of the master axes with respect to the operation states of the master axes in these machines. With this configuration, since the quantity of data sets including the state variable S and the judgment data D which can be obtained in a fixed time can be increased, it is possible to improve the speed and reliability of the learning of the future predicted position of the master axis with respect to the operation state of the master axis in the machine by using more diverse data sets as inputs.

Figure 2:
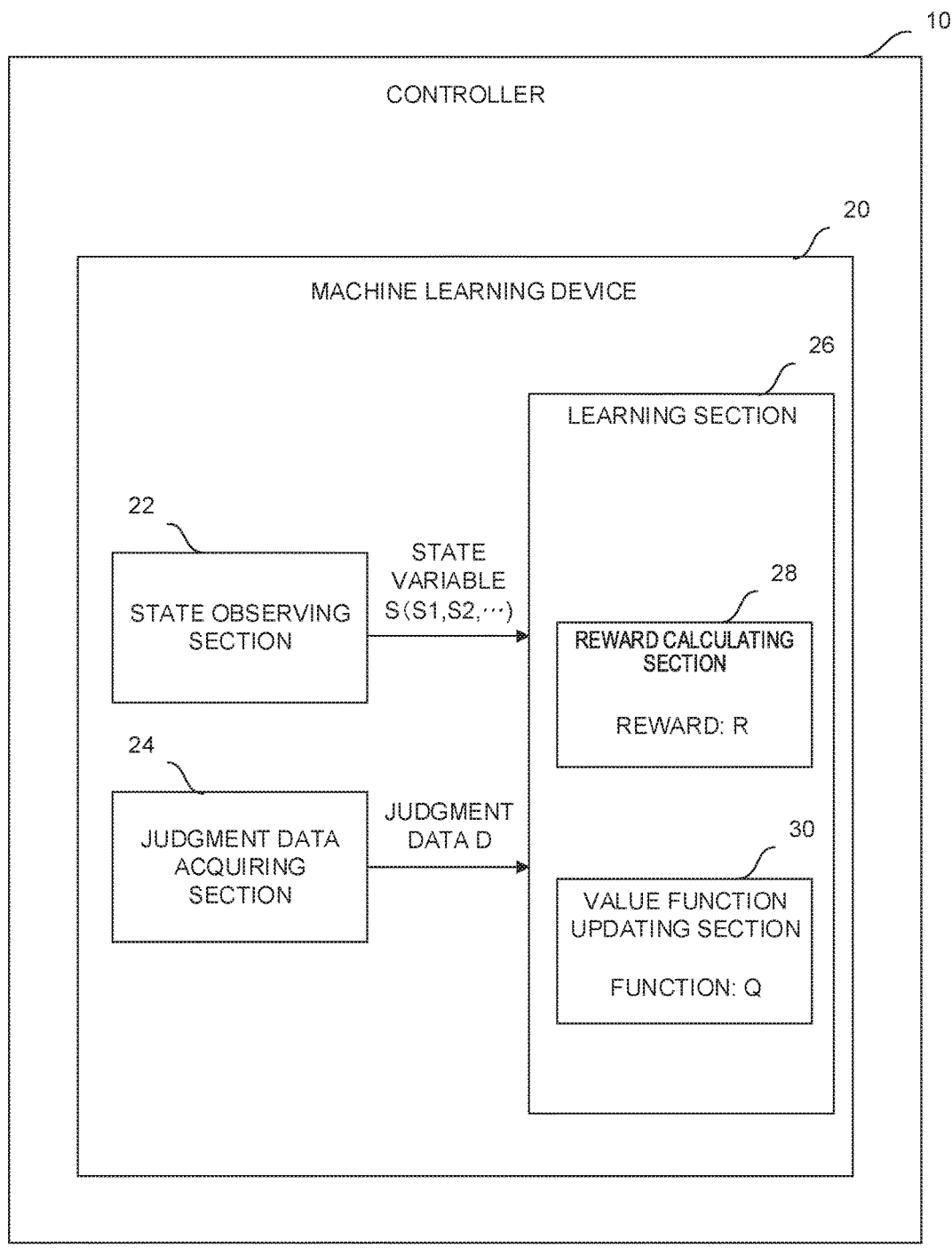
FIG. 2 is a schematic functional block diagram depicting a mode of the controller.

In the machine learning device 20 having the above-described configuration, the learning algorithm which is executed by the learning section 26 is not limited to a particular learning algorithm, and a publicly known learning algorithm can be adopted as machine learning. FIG. 2 depicts a configuration, which is a mode of the controller 10 depicted in FIG. 1, including the learning section 26 that executes reinforcement learning as an example of the learning algorithm. The reinforcement learning is a technique of learning, as an optimum solution, a means (in the machine learning device of the present application, the future predicted position of the master axis with respect to the operation state of the master axis) by which a cycle in which the current state (that is, an input) of an environment in which a subject of learning is present is observed, a predetermined action (that is, an output) is executed in the current state, and a reward of some kind is given for that action is repeated in a trial-and-error manner so that the sum total of the rewards is maximized.

In the machine learning device 20 of the controller 10 depicted in FIG. 2, the learning section 26 includes a reward calculating section 28 that obtains a reward R related to the properness judgment result (corresponding to the judgment data D which is used in the next learning cycle) of the synchronous control of the slave axis based on the state variable S and a value function updating section 30 that updates a function Q indicating the value of the future predicted position of the master axis with respect to the operation state of the master axis by using the reward R. The learning section 26 learns the future position of the master axis with respect to the operation state of the master axis as a result of the value function updating section 30 repeating update of the function Q.

An example of the algorithm of the reinforcement learning which is executed by the learning section 26 will be described. The algorithm of this example is what is known as Q-learning and is a technique of learning a function Q(s, a) indicating the value of an action which is observed when, by using a state s of an action entity and an action a which can be selected by the action entity in the state s as independent variables, the action a is selected in the state s. Selecting an action a with which the highest value function Q is obtained in a state s is an optimum solution. Q-learning is started in a state in which a correlation between a state s and an action a is unknown, and, by repeating trial and error by which various actions a are selected in an arbitrary state s, the value function Q is repeatedly updated and made closer to the optimum solution. Here, by adopting a configuration in which, when an environment (that is, a state s) changes as a result of an action a having been selected in the state s, a reward (that is, weighting of the action a) r in accordance with the change is obtained and guiding the learning so that an action a by which a higher reward r can be obtained is selected, it is possible to make the value function Q close to the optimum solution in a relatively short period of time.

An update formula of the value function Q can be generally expressed as Formula 1 given below. In Formula 1, $s_t$ and $a_t$ are a state and an action, respectively, at a time t and the state changes to $s_{t+1}$ by the action $a_t$. $r_{t+1}$ is a reward which is obtained as a result of the state having changed from $s_t$ to $s_{t+1}$. A term maxQ means Q which is obtained when an action a by which the maximum value Q is obtained at a time t+1 (so considered at a time t) is performed. α and γ are a learning coefficient and a rate of discount respectively and are arbitrarily set so that 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right) \quad \text{[Formula 1]}$$

When the learning section 26 executes Q-learning, the state variable S observed by the state observing section 22 and the judgment data D acquired by the judgment data acquiring section 24 correspond to the state s of the update formula, an action as to how the future predicted position of the master axis with respect to the current state (that is, the operation state of the master axis) has to be changed corresponds to the action a of the update formula, and a reward R which is obtained by the reward calculating section 28 corresponds to the reward r of the update formula. Thus, by Q-learning using the reward R, the value function updating section 30 repeatedly updates the function Q indicating the value of the future predicted position of the master axis with respect to the current state.

The reward R which is obtained by the reward calculating section 28 can be set as, for example, a positive (plus) reward R if a synchronization error of the slave axis is judged to be "proper" (for instance, if a synchronization error of the slave axis falls within an acceptable range) when, after the future predicted position of the master axis with respect to the operation state of the master axis is determined, the synchronous control of the slave axis is performed based on that future predicted position of the master axis and set as a negative (minus) reward R if a synchronization error of the slave axis is judged to be "not proper" (for instance, if a synchronization error of the slave axis falls outside an acceptable range) when, after the future predicted position of the master axis with respect to the operation state of the master axis is determined, the synchronous control of the slave axis is performed based on that future predicted position of the master axis. The absolute values of positive and negative rewards R may be equal to each other or may be different from each other. Moreover, a judgment may be made by combining a plurality of values included in the judgment data D as a condition for judgment.

Moreover, the properness judgment result of a synchronization error of the slave axis can be set in a plurality of levels, not in two levels: "proper" and "not proper". For example, a configuration can be adopted in which, if the maximum value of tolerance of a synchronization error of the slave axis is $E_{max}$, a reward R=5 is given when a synchronization error E of the slave axis is $0 \leq E < E_{max}/5$, a reward R=2 is given when a synchronization error E of the slave axis is $E_{max}/5 \leq E < E_{max}/2$, and a reward R=1 is given when a synchronization error E of the slave axis is $E_{max}/2 \leq E \leq E_{max}$. Furthermore, a configuration can also be adopted in which $E_{max}$ is set so as to be relatively large in an early stage of learning and $E_{max}$ is decreased with the progress in learning.

The value function updating section 30 may have an action value table showing the state variable S, the judgment data D, and the reward R in a state in which the state variable S, the judgment data D. and the reward R are organized by being correlated with an action value (for example, a numerical value) represented by the function Q. In this case, an act of updating the function Q which is performed by the value function updating section 30 is synonymous with an act of updating the action value table which is performed by the value function updating section 30. Since a correlation between the current state of the environment and the future predicted position of the master axis is unknown at the start of Q-learning, various state variables S, judgment data D, and rewards R are prepared in the action value table in a state in which the various state variables S, judgment data D, and rewards R are each correlated with the value (function Q) of a randomly set action value. Once the judgment data D is acquired, the reward calculating section 28 can immediately calculate a reward R corresponding to the judgment data D, and the calculated value R is written into the action value table.

With the progress of the Q-learning using the reward R corresponding to the properness judgment result of a synchronization error of the slave axis, the learning is guided in a direction in which an action by which a higher reward R can be obtained is selected, and the value (function Q) of the action value about an action which is done in the current state is rewritten in accordance with the state of the environment (that is, the state variable S and the judgment data D) which changes as a result of the selected action having been performed in the current state and the action value table is updated. By repeating this update, the value (function Q) of the action value which is shown in the action value table is rewritten so that the more appropriate an action is, the larger the value becomes. In this way, a correlation, which was unknown, between the current state of the environment (the operation state of the master axis) and an action (the future predicted position of the master axis with respect thereto becomes gradually clear. That is, the relationship between the operation state of the master axis and the future predicted position of the master axis is made gradually closer to the optimum solution by update of the action value table.

Figure 3:
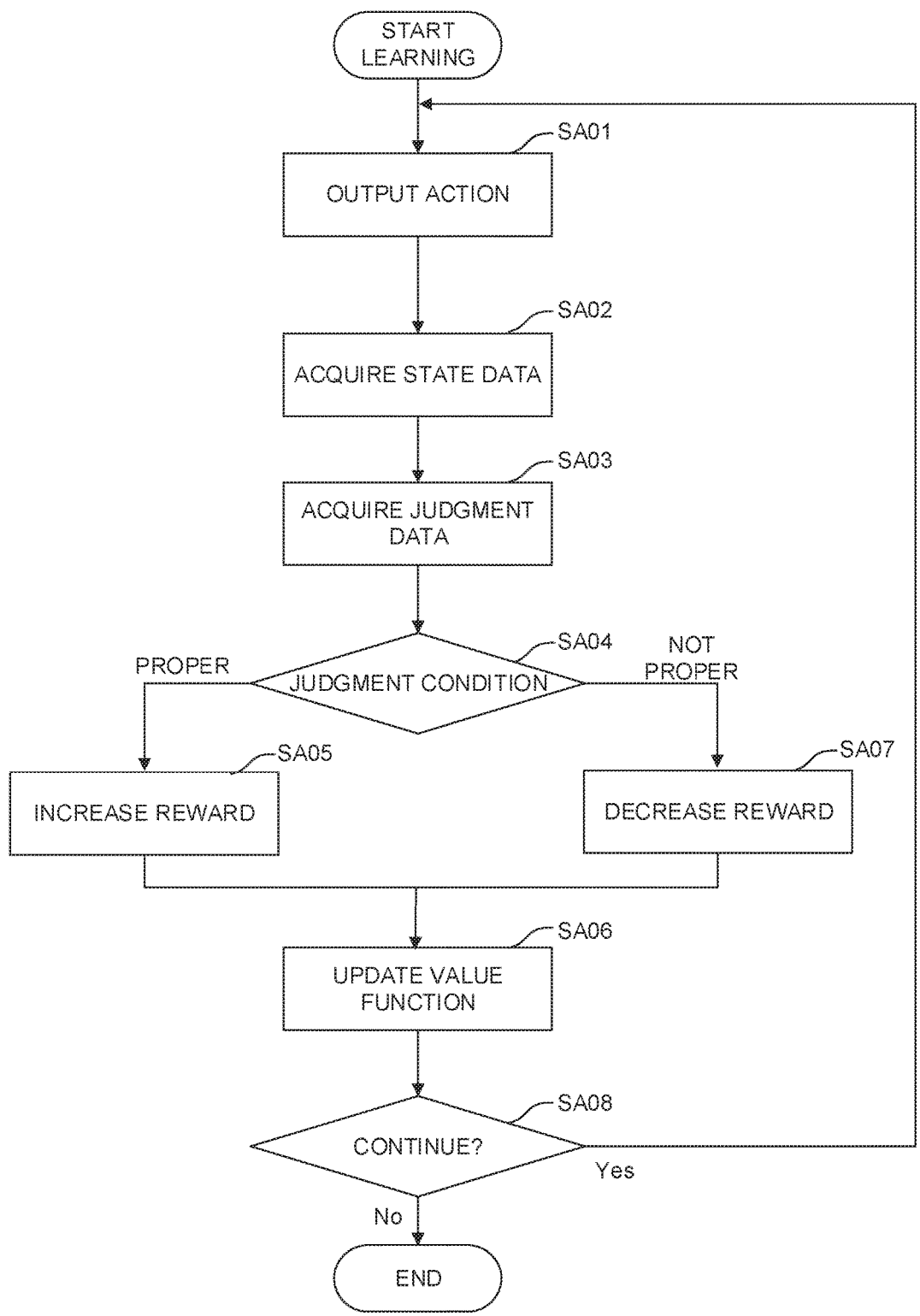
FIG. 3 is a schematic flowchart showing a mode of a machine learning method.

With reference to FIG. 3, the flow of the above-described Q-learning (that is, a mode of the machine learning method) which is executed by the learning section 26 will be further described. First, in Step SA01, while referring to the action value table at that point in time, the value function updating section 30 selects, as an action which is done in the current state indicated by the state variable S observed by the state observing section 22, the future predicted position of the master axis by teaching given by the operator, by a method of predicting the future position of the master axis by the prior art technique, or, in addition thereto, by performing, for example, addition and subtraction of random values. Next, the value function updating section 30 receives, in Step SA02, the state variable S of the current state which is observed by the state observing section 22 and receives, in Step SA03, the judgment data D of the current state which is acquired by the judgment data acquiring section 24. Next, the value function updating section 30 judges, in Step SA04, whether or not the future predicted position of the master axis has been proper based on the judgment data D; if the future predicted position of the master axis has been proper, the value function updating section 30 applies, in Step SA05, the positive reward R obtained by the reward calculating section 28 to the update formula of the function Q and then updates, in Step SA06, the action value table by using the state variable S and the judgment data D in the current state, the reward R, and the value (the updated function Q) of the action value. If the value function updating section 30 judges, in Step SA04, that the future predicted position of the master axis has not been proper, the value function updating section 30 applies the negative reward R obtained by the reward calculating section 28 to the update formula of the function Q in Step SA07 and then updates, in Step SA06, the action value table by using the state variable S and the judgment data D in the current state, the reward R, and the value (the updated function Q) of the action value. The learning section 26 repeatedly updates the action value table by repeating Steps SA01 to SA07 and advances the learning of the future predicted position of the master axis with respect to the operation state of the master axis.

Figure 4A:
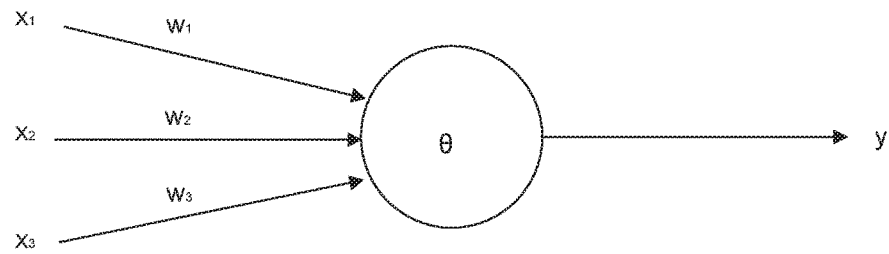
FIG. 4A is a diagram explaining a neuron.
Figure 4B:
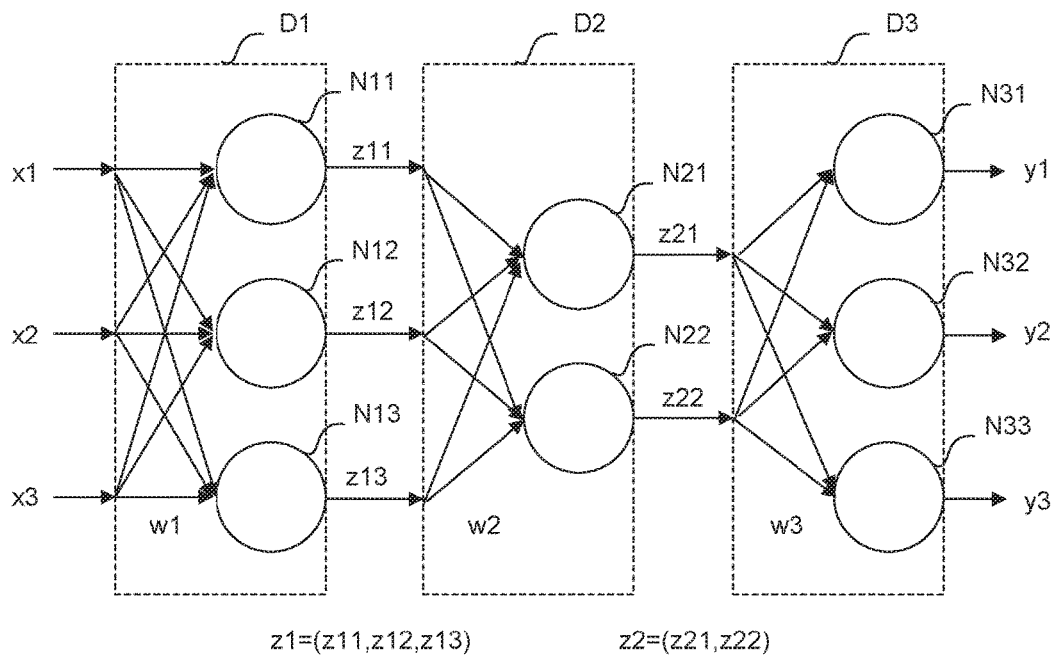
FIG. 4B is a diagram explaining a neural network.

When the above-described reinforcement learning is advanced, a neural network can be used in place of Q-learning, for example. FIG. 4A schematically depicts a model of a neuron. FIG. 4B schematically depicts a model of a three-layer neural network configured by combining the neurons depicted in FIG. 4A. The neural network can be configured by, for example, a calculation device, storage, or the like which imitates the model of the neuron.

The neuron depicted in FIG. 4A outputs a result y of a plurality of inputs x (here, for example, inputs $x_1$ to $x_3$). The inputs $x_1$ to $x_3$ are multiplied by weights w ($w_1$ to $w_3$) corresponding to these inputs x. As a result, the neuron outputs an output y expressed by Formula 2 given below. In Formula 2, all of the input x, the output y, and the weight w are vectors. Moreover, θ is a bias and $f_k$ is an activating function.

$$y = f_k(\Sigma_{i=1}^{n} x_i w_i - \theta) \qquad \text{[Formula 2]}$$

A plurality of inputs x (here, for example, inputs x1 to x3) are input to the three-layer neural network depicted in FIG. 4B from the left side thereof, and results y (here, for example, results y1 to y3) are output from the right side thereof. In an example depicted in the drawing, each of the inputs x1, x2, and x3 is multiplied by a corresponding weight (generically expressed as w1) and each of the inputs x1, x2, and x3 is input to three neurons N11, N12, and N13.

In FIG. 4B, the outputs of the neurons N11 to N13 are generically expressed as z1. z1 can be regarded as a feature vector which is the extracted feature amount of an input vector. In the example depicted in the drawing, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

In FIG. 4B, the outputs of the neurons N21 and N22 are generically expressed as z2. z2 can be regarded as a feature vector which is the extracted feature amount of the feature vector z1. In the example depicted in the drawing, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally the neurons N31 to N33 respectively output the results y1 to y3.

It is also possible to use a technique of so-called deep learning using a neural network with three or more layers.

In the machine learning device 20 of the controller 10, as a result of the learning section 26 performing calculation of a multi-layer structure in accordance with the above-described neural network by using the state variable S and the judgment data D as the input x, the future predicted position of the master axis (the result y) can be output. Operation modes of the neural network include a learning mode and a value prediction mode; for example, learning of the weight W can be performed in the learning mode by using a learning data set and a value judgment of an action can be made in the value prediction mode by using the learned weight W. In the value prediction mode, detection, classification, inference, and so forth can also be performed.

The above-described configuration of the controller 10 can be described as a machine learning method (or software) which is executed by the CPU of the computer. This machine learning method is a machine learning method of learning the future predicted position of the master axis with respect to the operation state of the master axis and includes a step in which the CPU of the computer observes, as the state variable S indicating the current state of an environment in which the synchronous control of the slave axis is performed, the master axis predicted position data S1 indicating the future predicted position of the master axis and the master axis operation state data S2 indicating the operation state of the master axis, a step in which the CPU of the computer acquires the judgment data D indicating the properness judgment result of a synchronization error of the slave axis, and a step in which the CPU of the computer performs learning by correlating the future predicted position of the master axis with the master axis operation state data S2 by using the state variable S and the judgment data D.

Figure 5:
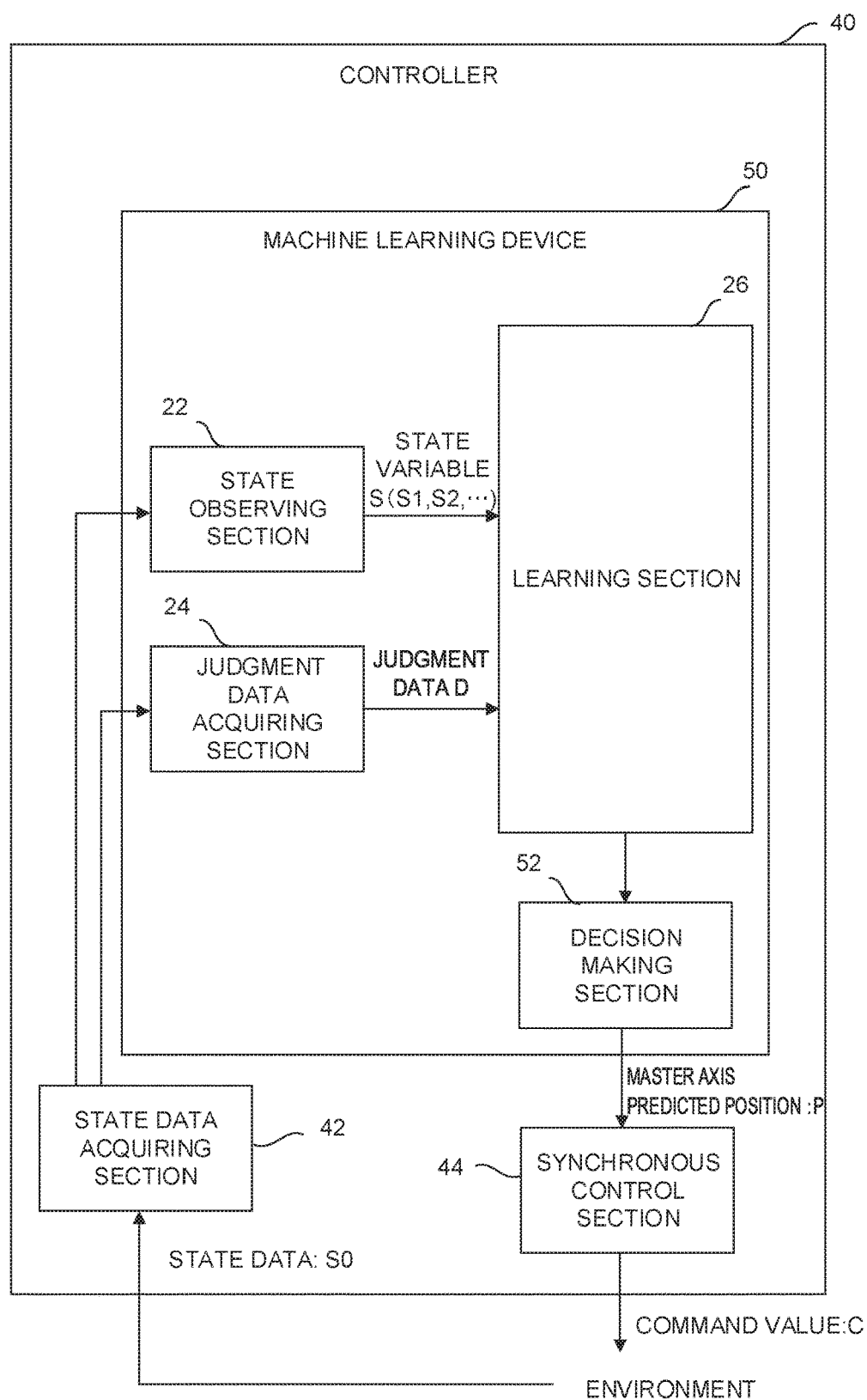
FIG. 5 is a schematic functional block diagram of a controller according to a second embodiment.

FIG. 5 depicts a controller 40 according to a second embodiment. The controller 40 includes a machine learning device 50, a state data acquiring section 42 that acquires, as state data S0, master axis predicted position data S1 and master axis operation state data S2 of a state variable S which is observed by a state observing section 22, and a synchronous control section 44 that performs synchronous control of the slave axis based on the future predicted position P of the master axis output from the machine learning device 50. The state data S0 which is acquired by the state data acquiring section 42 can also include slave axis operation state data S3. The state data acquiring section 42 can acquire the state data S0 from values acquired from a first measuring device and the controller of the master axis and the slave axis, appropriate data entry which is performed by the operator, and so forth.

In addition to software (such as a learning algorithm) and hardware (such as a CPU of a computer) which are used by the machine learning device 50 to learn the future predicted position of the master axis with respect to the operation state of the master axis by machine learning, the machine learning device 50 of the controller 40 includes software (such as an arithmetic algorithm) and hardware (such as a CPU of a computer) for outputting the future predicted position of the master axis with respect to the operation state of the master axis. The machine learning device 50 of the controller 40 may also have a configuration in which one common CPU executes all the software such as a learning algorithm and an arithmetic algorithm.

A decision making section 52 can be configured as, for instance, a function of the CPU of the computer. Alternatively, the decision making section 52 can be configured as, for instance, software for making the CPU of the computer function. The decision making section 52 outputs, to the controller 40, the future predicted position P of the master axis with respect to the operation state of the master axis, the future predicted position P learned by the learning section 26. The synchronous control section 44 of the controller 40 generates, based on the future predicted position P of the master axis output from the decision making section 52, a command value C for performing synchronous control of the slave axis and outputs the generated command value C to the slave axis or the machine. When the synchronous control section 44 generates the command value C of the synchronous control of the slave axis based on the future predicted position P of the master axis which is output from the decision making section 52 and outputs the generated command value C to the slave axis or the machine, the state of the environment changes in response thereto.

In the next learning cycle, the state observing section 22 observes the state variable S changed after the output of the command value of the synchronous control of the slave axis to the environment by the synchronous control section 44 based on the future predicted position P of the master axis output from the decision making section 52. The learning section 26 learns the future predicted position of the master axis with respect to the operation state of the master axis by updating the value function Q (that is, the action value table), for example, by using the changed state variable S. In doing so, instead of acquiring the master axis predicted position data S1 from the state data S0 which is acquired by the state data acquiring section 42, the state observing section 22 may observe the master axis predicted position data S1 from the internal memory of the machine learning device 20 as described in the first embodiment.

The decision making section 52 outputs the learned future predicted position P of the master axis with respect to the operation state of the master axis, and the synchronous control section 44 generates the command value C of the synchronous control of the slave axis based on the output future predicted position P of the master axis and outputs the generated command value C to the slave axis or the machine. By repeating this cycle, the machine learning device 50 advances the learning of the future predicted position of the master axis with respect to the operation state of the master axis and gradually improves the reliability of the future predicted position of the master axis, which is determined thereby, with respect to the operation state of the master axis.

The machine learning device 50 of the controller 40 having the above-described configuration produces the same effect as that of the above-described machine learning device 20. In particular, the machine learning device 50 can change the state of the environment by an output of the decision making section 52 (via the controller 40). On the other hand, the machine learning device 20 can make an external device (a machine or a controller of the machine) perform a function corresponding to the decision making section for reflecting the learning result of the learning section 26 in the environment.

FIG. 6 depicts a system 70 according to an embodiment provided with a machine 60. The system 70 includes a plurality of machines 60 and 60' having at least the same machine configuration and a network 72 that connects the machines 60 and 60', and at least one of the plurality of machines 60 and 60' is configured as the machine 60 provided with the above-described controller 40. Moreover, the system 70 may include the machine 60' which is not provided with the controller 40. The machines 60 and 60' have a common configuration which is required for performing synchronous control of the slave axis with respect to the operation of the master axis.

In the system 70 having the above-described configuration, of the plurality of machines 60 and 60', the machine 60 provided with the controller 40 can automatically and accurately obtain the future predicted position of the master axis in the machines 60 and 60' in accordance with the operation state of the master axis by using the learning result of the learning section 26 without the help of calculation or estimate. Moreover, a configuration can be adopted in which the controller 40 of at least one machine 60 learns the future predicted position of the master axis with respect to the operation state of the master axis, which is common to all the machines 60 and 60', based on the state variable S and the judgment data D obtained for each of the other machines 60 and 60' and the learning result is shared by all the machines 60 and 60'.

Thus, with the system 70, by using more diverse data sets (including the state variable S and the judgment data D) as inputs, it is possible to improve the speed and reliability of the learning of the future predicted position of the master axis with respect to the operation state of the master axis.

FIG. 7 depicts a system 70' according to another embodiment provided with a machine 60'. The system 70' includes a machine learning device 50 (or 20), a plurality of machines 60' having the same machine configuration, and a network 72 that connects the machines 60' and the machine learning device 50 (or 20).

In the system 70' having the above-described configuration, the machine learning device 50 (or 20) can learn the future predicted position of the master axis with respect to the operation state of the master axis which is common to all the machines 60' based on the state variable S and the judgment data D obtained for each of the plurality of machines 60' and, by using the learning result, can automatically and accurately obtain the future predicted position of the master axis in accordance with the operation state of the master axis without the help of calculation or estimate.

The system 70' may have a configuration in which the machine learning device 50 (or 20) is present in, for example, a cloud server or cell controller which is prepared in the network 72. With this configuration, it is possible to connect the required number of machines 60' to the machine learning device 50 (or 20) when necessary irrespective of the place or time in or at which each of the plurality of machines 60' is present.

The operator who is working on the systems 70 and 70' can make a judgment as to whether or not, at an appropriate time after the start of learning by the machine learning device 50 (or 20), the degree of achievement (that is, the reliability of the future predicted position of the master axis with respect to the operation state of the master axis) of learning, which is performed by the machine learning device 50 (or 20), of the future predicted position of the master axis with respect to the operation state of the master axis has reached a required level.

While the embodiments of the present invention have been described, the present invention is not limited only to the examples of the embodiments described above and can be carried out in various ways by being changed or modified as appropriate.

For example, the learning algorithm which is executed by the machine learning devices 20 and 50, the arithmetic algorithm which is executed by the machine learning device 50, the control algorithm which is executed by the controllers 10 and 40, and so forth are not limited to those described above, and various algorithms can be adopted.

Moreover, in the above-described embodiments, an example in which the machine learning devices 20 and 50 perform machine learning online on the controllers 10 and 40 has been described; instead, by recording the state data S and the judgment data D as log data at the time of synchronous control of the machine which is performed by the controllers 10 and 40 and collecting the recorded log data, the machine learning devices 20 and 50 may perform machine learning based on the state data S and the judgment data D acquired from the collected log data.

While the embodiments of the present invention have been described, the present invention is not limited to the examples of the embodiments described above and can be carried out in other ways by being changed or modified as appropriate.

The invention claimed is:

1. A controller that performs synchronous control of a slave axis so that the slave axis is synchronized with a position of a master axis, the controller comprising:
 a machine learning device that learns a future predicted position of the master axis with respect to an operation state of the master axis, wherein
 the machine learning device includes
  a state observing section that observes, as a state variable indicating a current state of an environment, master axis predicted position data indicating the future predicted position of the master axis and master axis operation state data indicating the operation state of the master axis,
  a judgment data acquiring section that acquires judgment data indicating a properness judgment result of a synchronization error of the slave axis, and
  a learning section that learns the future predicted position of the master axis by correlating the future predicted position of the master axis with the master axis operation state data by using the state variable and the judgment data.

2. The controller according to claim 1, wherein
 the state observing section further observes, as the state variable, slave axis operation state data indicating an operation state of the slave axis, and
 the learning section learns the future predicted position of the master axis by correlating the future predicted position of the master axis with both the master axis operation state data and the slave axis operation state data.

3. The controller according to claim 1, wherein
the learning section includes a reward calculating section that obtains a reward related to the properness judgment result, and a value function updating section that updates, by using the reward, a function indicating a value of the future predicted position of the master axis with respect to the operation state of the master axis.

4. The controller according to claim 1, wherein the learning section calculates the state variable and the judgment data in a multi-layer structure.

5. The controller according to claim 1, further comprising:
a decision making section that outputs the future predicted position of the master axis based on a learning result obtained by the learning section.

6. The controller according to claim 5, wherein the controller issues, to the slave axis, a synchronization command based on the future predicted position of the master axis output from the decision making section.

7. The controller according to claim 1, wherein the learning section learns the future predicted position of the master axis in each of a plurality of machines by using the state variable and the judgment data which are obtained for each of the plurality of machines.

8. The controller according to claim 1, wherein the machine learning device is present in a cloud server or cell controller.

9. A machine learning device that learns a future predicted position of a master axis with respect to an operation state of the master axis in synchronous control of a machine, the synchronous control by which a slave axis is synchronized with a position of the master axis, the machine learning device comprising:
a state observing section that observes, as a state variable indicating a current state of an environment, master axis predicted position data indicating the future predicted position of the master axis and master axis operation state data indicating the operation state of the master axis;
a judgment data acquiring section that acquires judgment data indicating a properness judgment result of a synchronization error of the slave axis; and
a learning section that learns the future predicted position of the master axis by correlating the future predicted position of the master axis with the master axis operation state data by using the state variable and the judgment data.

* * * * *